(12) United States Patent
Akaike et al.

(10) Patent No.: US 10,486,574 B2
(45) Date of Patent: Nov. 26, 2019

(54) VEHICLE FOOTREST DEVICE

(71) Applicant: TOYOTA BOSHOKU KABUSHIKI KAISHA, Aichi-ken (JP)

(72) Inventors: Fumitoshi Akaike, Aichi-ken (JP); Hiroshi Tsuji, Aichi-ken (JP); Yasuhiro Kato, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/988,563

(22) Filed: May 24, 2018

(65) Prior Publication Data
US 2018/0339632 A1 Nov. 29, 2018

(30) Foreign Application Priority Data

May 25, 2017 (JP) ................................ 2017-103351

(51) Int. Cl.
*B60N 3/06* (2006.01)
*B60N 2/90* (2018.01)

(52) U.S. Cl.
CPC ............. *B60N 3/063* (2013.01); *B60N 2/995* (2018.02)

(58) Field of Classification Search
CPC .......... B60N 3/063; B60N 3/06; B60N 2/995
USPC ................................................. 297/423.27
See application file for complete search history.

(56) References Cited

U.S. PATENT DOCUMENTS

| 2,484,803 | A | * | 10/1949 | Bell | B60N 2/995 297/423.22 |
| 6,474,728 | B1 | * | 11/2002 | Mendis | B60K 23/00 296/190.08 |
| 6,494,536 | B2 | * | 12/2002 | Plant | A47C 1/0352 297/284.11 |
| 6,572,172 | B1 | * | 6/2003 | Ninomiya | B60N 2/0232 296/65.07 |
| 7,556,307 | B2 | * | 7/2009 | Ohtsubo | B60N 2/074 180/326 |
| 9,855,860 | B2 | * | 1/2018 | Ahn | B60N 2/01 |
| 2002/0063449 | A1 | * | 5/2002 | Plant | B60N 2/34 297/68 |
| 2005/0109555 | A1 | * | 5/2005 | Ohtsubo | B60R 16/037 180/326 |

(Continued)

FOREIGN PATENT DOCUMENTS

JP 2006-204765 8/2006

*Primary Examiner* — Mark R Wendell
(74) *Attorney, Agent, or Firm* — Greenblum & Bernstein, P.L.C

(57) ABSTRACT

A vehicle footrest device including: a footrest; and a footrest moving mechanism including: a rail fixed on a vehicle floor and extending in a front and rear direction; a slider configured to be guided so as to be slidable in the front and rear direction along the rail; and a variable-length arm bridged in a height direction between the slider and a vehicle seat and configured to change a bridging length between the slider and the vehicle seat by a sliding displacement of the variable-length arm in response to a forward and rearward movement of the slider, wherein the footrest is connected to the variable-length arm, and a position in the front and rear direction and an inclination angle of the footrest to the vehicle floor are configured to be changed according to a movement of the variable-length arm caused by the forward and rearward movement of the slider.

8 Claims, 11 Drawing Sheets

(56) References Cited

U.S. PATENT DOCUMENTS

| | | | |
|---|---|---|---|
| 2008/0231090 A1* | 9/2008 | Takeda | B60N 2/06 297/83 |
| 2009/0058150 A1* | 3/2009 | Whalen | A47C 7/50 297/69 |
| 2013/0038107 A1* | 2/2013 | Tamura | B60N 2/0232 297/331 |
| 2018/0229638 A1* | 8/2018 | Minato | B60N 2/22 |

* cited by examiner

VEHICLE FOOTREST DEVICE

CROSS-REFERENCE TO RELATED APPLICATIONS

This application claims priority from Japanese Patent Application No. 2017-103351 filed on May 25, 2017, the entire contents of which are incorporated herein by reference.

TECHNICAL FIELD

The disclosure relates to a vehicle footrest device. In particular, the disclosure relates to a vehicle footrest device that includes a footrest installed on a vehicle floor and a footrest moving mechanism movably connecting the footrest to the vehicle floor.

BACKGROUND

There is known a seat having a structure in which a footrest overhang like eaves and capable of supporting heels of a seated person is provided at a leading end portion of an ottoman serving as a foot placement part (JP-A-2006-204765). The ottoman extends forward and downward from a front end portion of a seat cushion so as to support a lower leg of a seated person in a comfortable posture. Since the leading end portion of the ottoman is in contact with a floor, the ottoman is capable of stably receiving a load applied from the lower leg of the seated person by transmitting the load onto the floor.

In the above related art, the ottoman is used only in a fixed position where it is in contact with the floor. Therefore, the use position of the footrest cannot be changed, and thus, the convenience becomes poor.

SUMMARY

The disclosure aims to make it possible to appropriately change the use position of the footrest.

In order to achieve the above object, the vehicle footrest device of the disclosure adopts the following means.

An aspect of the present disclosure is a vehicle footrest device including: a footrest installed on a vehicle floor; and a footrest moving mechanism movably connecting the footrest to the vehicle floor, the footrest moving mechanism including: a rail fixed on the vehicle floor and extending in a front and rear direction; a slider configured to be guided so as to be slidable in the front and rear direction along the rail; and a variable-length arm bridged in a height direction between the slider and a vehicle seat on which a user of the footrest sits and configured to change a bridging length between the slider and the vehicle seat by a sliding displacement of the variable-length arm in response to a forward and rearward movement of the slider, wherein the footrest is connected to the variable-length arm, and a position in the front and rear direction and an inclination angle of the footrest to the vehicle floor are configured to be changed according to a movement of the variable-length arm caused by the forward and rearward movement of the slider.

DETAILED DESCRIPTION

Hereinafter, modes for carrying out the disclosure will be described with reference to the drawings.

First Embodiment

⟨Schematic Configuration of Footrest Device 1⟩

First, a configuration of a footrest device 1 (vehicle footrest device) according to a first embodiment will be described with reference to FIGS. 1 to 11. In the following description, the directions such as a front and rear direction, an upper and lower direction, and a right and left direction refer to the respective directions as indicated in each of the drawings. Further, the "seat width direction" refers to a left and right direction of a seat S, the "seat height direction" refers to an upper and lower direction of the seat S, and the "seat front and rear direction" refers to a front and rear direction of the seat S.

Figure 1:
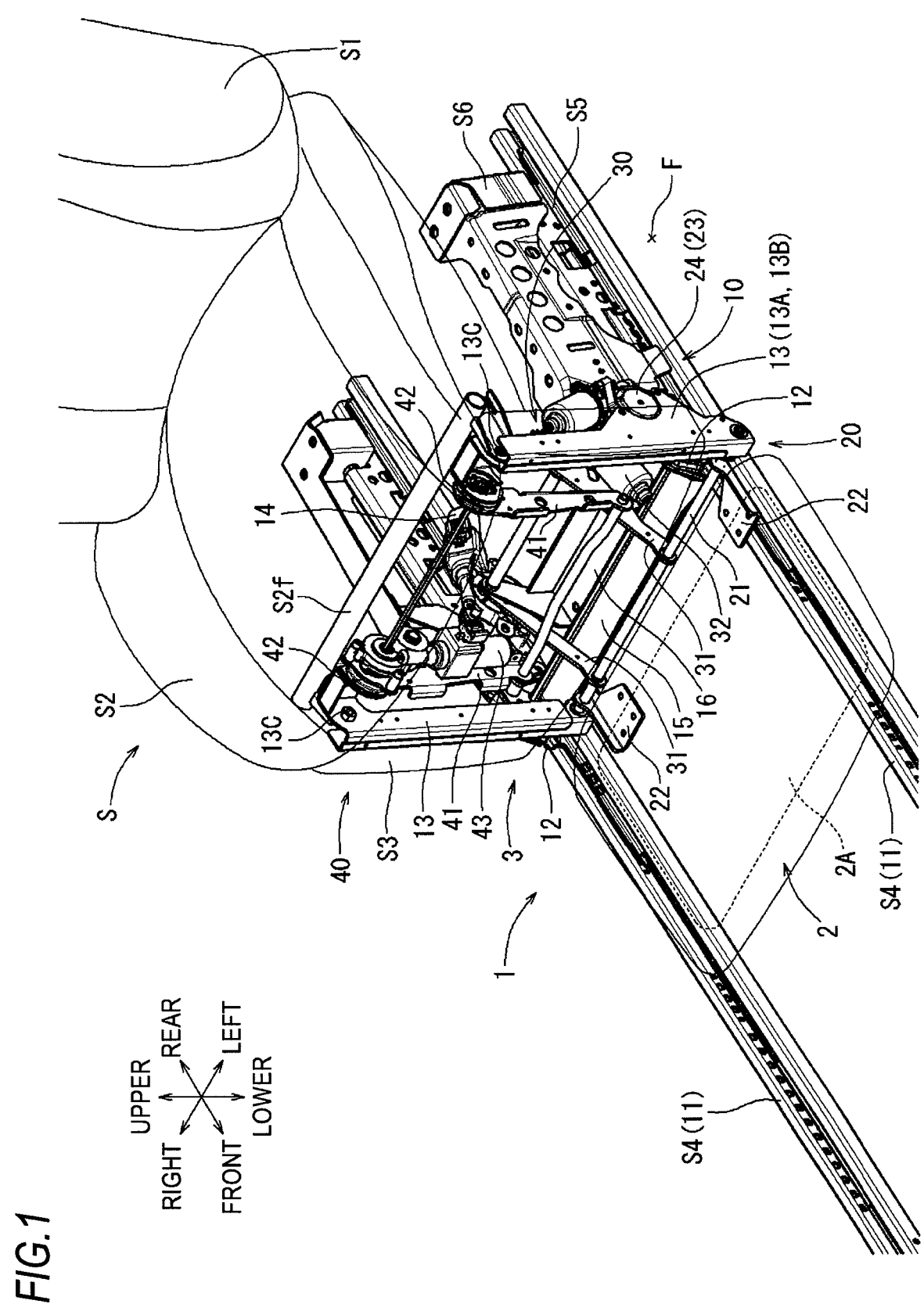
FIG. 1 is a perspective view showing a schematic configuration of a vehicle footrest device according to a first embodiment.
Figure 2:
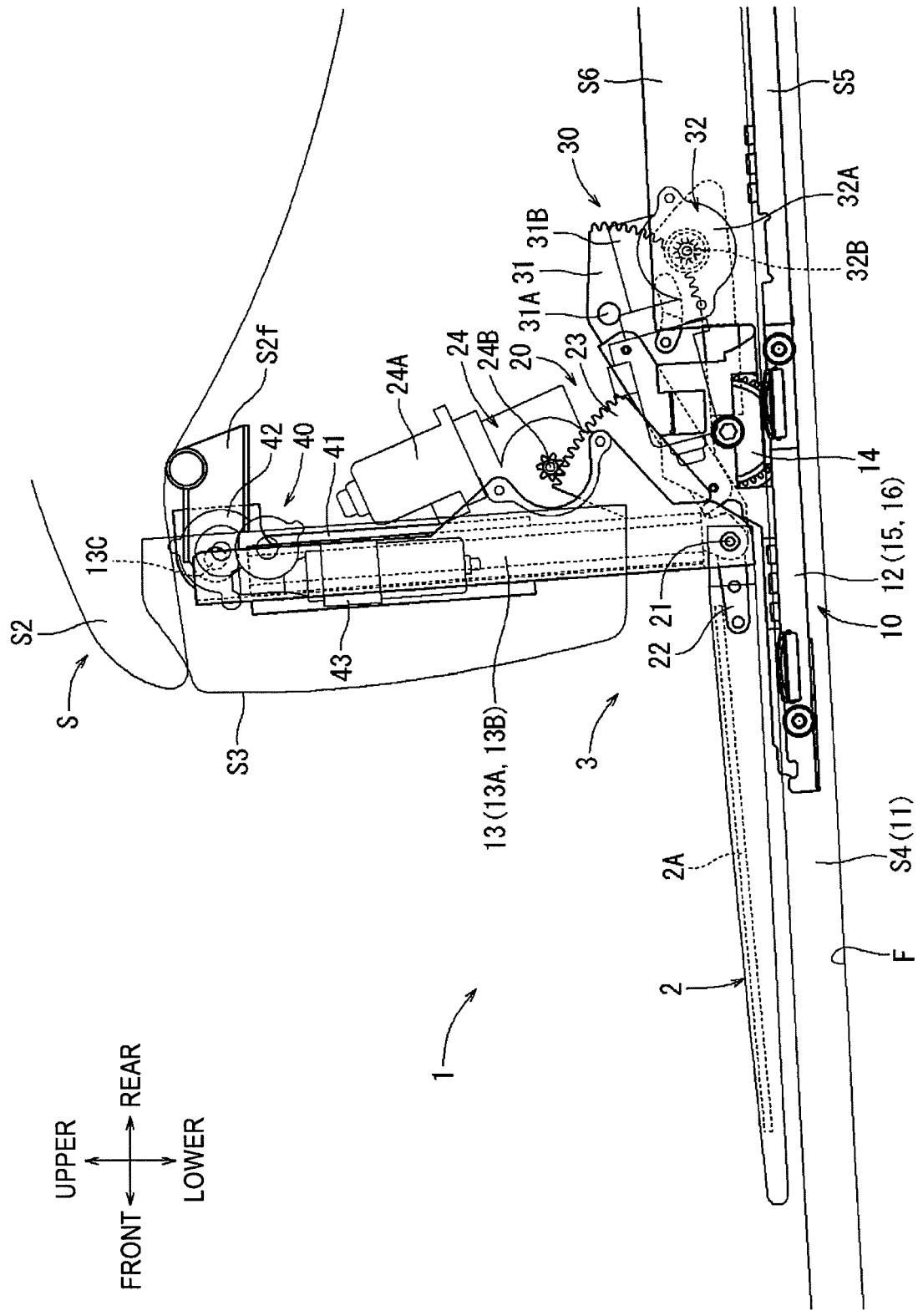
FIG. 2 is a side view of FIG. 1.

As shown in FIGS. 1 and 2, the footrest device 1 of the present embodiment is mounted on the seat S (vehicle seat) installed as a rear side seat of an automobile. Specifically, the footrest device 1 includes a flat plate-shaped footrest 2 as a foot placement part and a footrest moving mechanism 3 for allowing the footrest 2 to move in the front area of the seat S. The seat S includes a seat back S1 serving as a backrest portion of a seated person, a seat cushion S2 serving as a seating part, and an ottoman S3 raised from a front edge of the seat cushion S2 to serve as a foot placement portion of a seated person.

The seat S is connected to a pair of left and right slide rails S4 installed on an automobile floor F (vehicle floor) and extending to be elongated in the seat front and rear direction. The position of the seat S can be adjusted in the seat front and rear direction along the slide rails S4. Specifically, upper rails S5 on each side are slidably assembled to the slide rails S4 on each side, and the seat S is integrally assembled to the upper rails S5 via pedestal-shaped supports S6, respectively. With this configuration, the position of the seat S can be adjusted in the seat front and rear direction as the upper rails S5 are slid with respect to the slide rails S4 in the seat front and rear direction by driving a driving device (not shown).

The footrest 2 is disposed with its surface facing upward at the front lower position of the seat S on which a seated person sitting on the seat S can suitably places his sole. The footrest 2 has a panel heater 2A embedded therein and can radiate thermal heat by radiant heat from an upper surface side of the footrest 2, thereby warming the sole of the seated person. Here, the panel heater 2A corresponds to the "heat source" in the disclosure.

The footrest moving mechanism 3 includes a slide mechanism 10 (see FIGS. 3 and 4) capable of adjusting the use position of the footrest 2 in the seat front and rear direction, a tilt mechanism 20 (see FIG. 5) capable of adjusting the use angle of the footrest 2 in the seat height direction, and a lift mechanism 30 (see FIG. 6) capable of adjusting the use position of the footrest 2 in the seat height direction.

⟨Configuration of Slide Mechanism 10⟩

As shown in FIGS. 8 to 11, the slide mechanism 10 includes rails 11 configured by the pair of left and right slide rails S4, a pair of left and right sliders 12 slidably assembled to these rails 11, and a pair of left and right expandable variable-length arms 13 bridged between the sliders 12 and a connection bracket S2f connected to a front edge (not shown) of the seat cushion S2. Further, the slide mechanism 10 includes a driving unit 14 configured to drive the sliders 12 so as to be slidable along the rails 11, a base 15 integrally bridged between the sliders 12, and a support bracket 16 fixed on the base 15.

Each of the pair of left and right sliders 12 is inserted and assembled to each of the rails 11 from either the front or rear open end so that a cross-sectional shape of each slider 12 is engaged with a cross-sectional shape of each rail 11. With this assembly, the sliders 12 are assembled to the rails 11 in a state where they are prevented from coming off in the seat height direction and the seat width direction with respect to the rails 11 and can slide only in the seat front and rear direction with respect to the rails 11 due to an engagement of the cross-sectional shapes of each other. The sliders 12 can smoothly slide in the seat front and rear direction with respect to the rails 11 by rollers 12A assembled around left and right legs thereof.

The sliders 12 are held in a state where the sliding thereof is stopped when a rotation of wheels 14B of the driving unit 14 (to be described later) assembled therewith is prevented by a braking force of the driving unit 14. The sliders 12 are adapted to move in a corresponding sliding direction when the wheels 14B are rotated so as to roll on the rails 11 by driving the driving unit 14.

Figure 10:
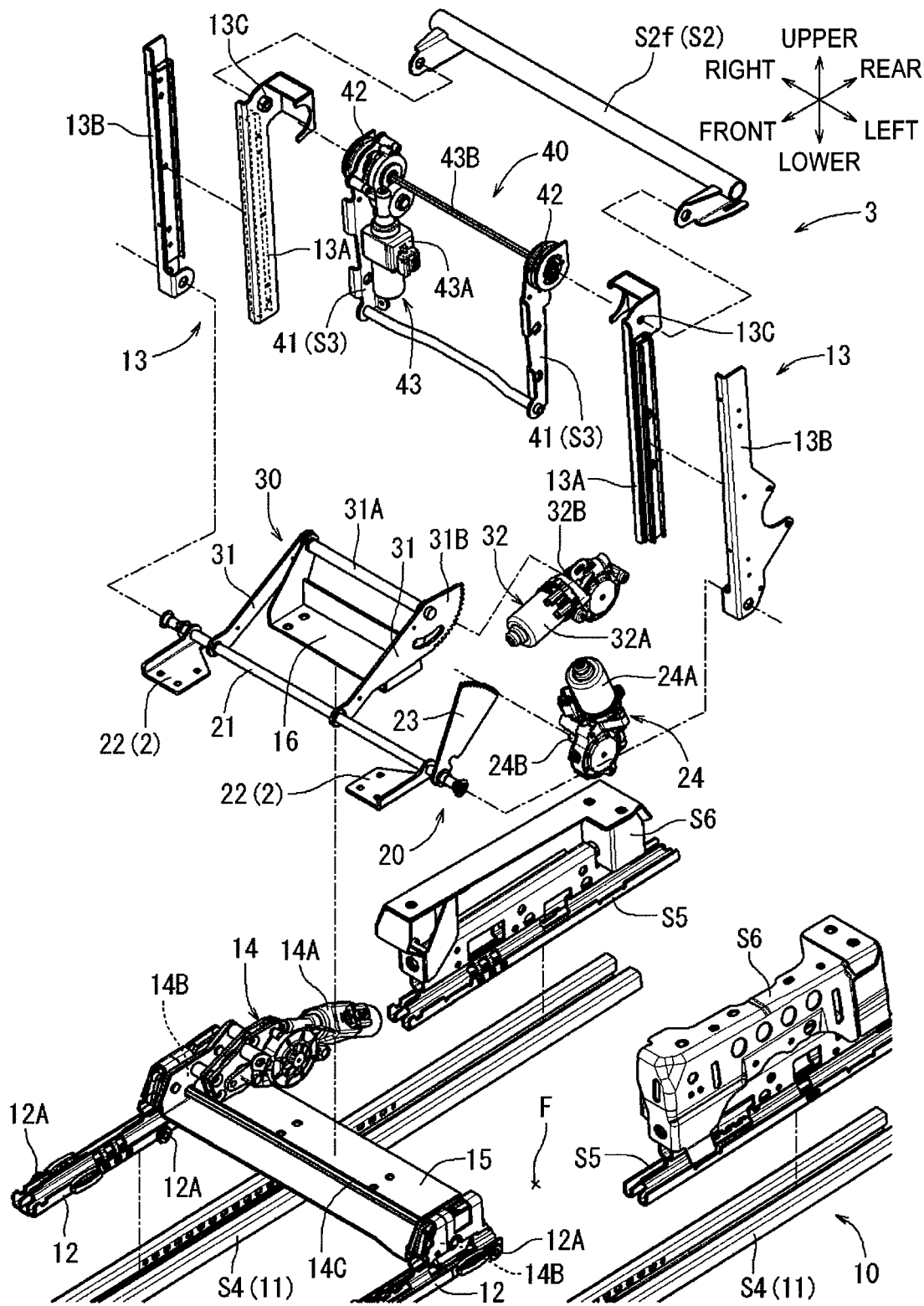
FIG. 10 is an exploded perspective view of the footrest moving mechanism.
Figure 11:
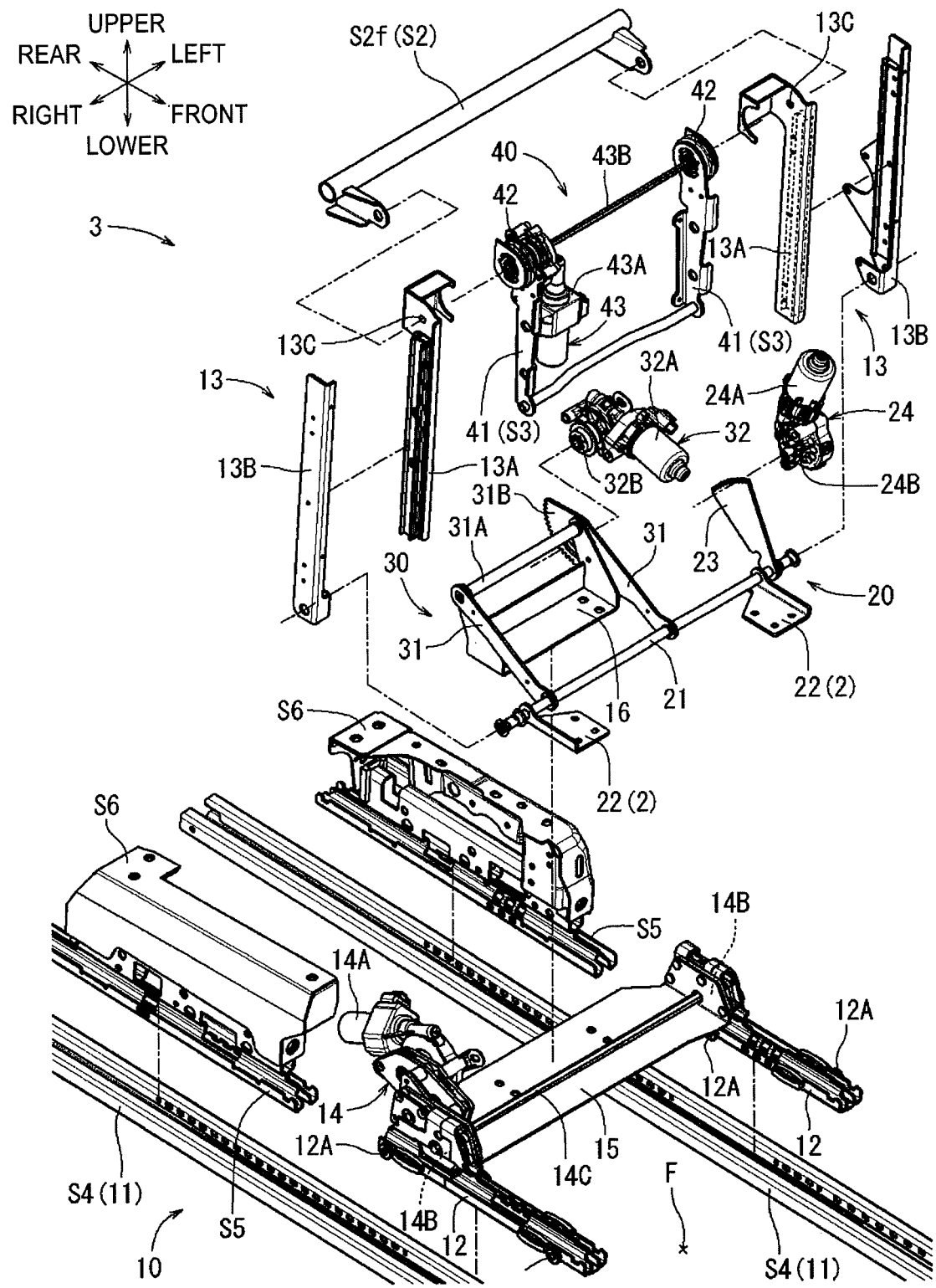
FIG. 11 is a perspective view of FIG. 10 as seen from the opposite side.

As shown in FIGS. 10 and 11, each of the pair of left and right variable-length arms 13 includes a first arm 13A extending in a straight elongated plate shape, a second arm 13B extending in a straight elongated plate shape and assembled to the first arm 13A so as to be slidable in a longitudinal direction, and a rotation shaft 13C rotatably connecting an upper end of the first arm 13A to left and right end portions of the connection bracket S2f. Here, the first arm 13A and the second arm 13B of each variable-length arm 13 correspond to the "split arm" in the disclosure, respectively.

The pair of left and right variable-length arms 13 is in a state where lower ends of the second arms 13B thereof are rotatably connected to a connection shaft 21 of the tilt mechanism 20 (to be described later) assembled on the sliders 12, respectively. With this assembly, the variable-length arms 13 are in a bridged state where both ends thereof are respectively pin-joined between the sliders 12 and each of left and right end portions of the connection bracket S2f.

Figure 3:
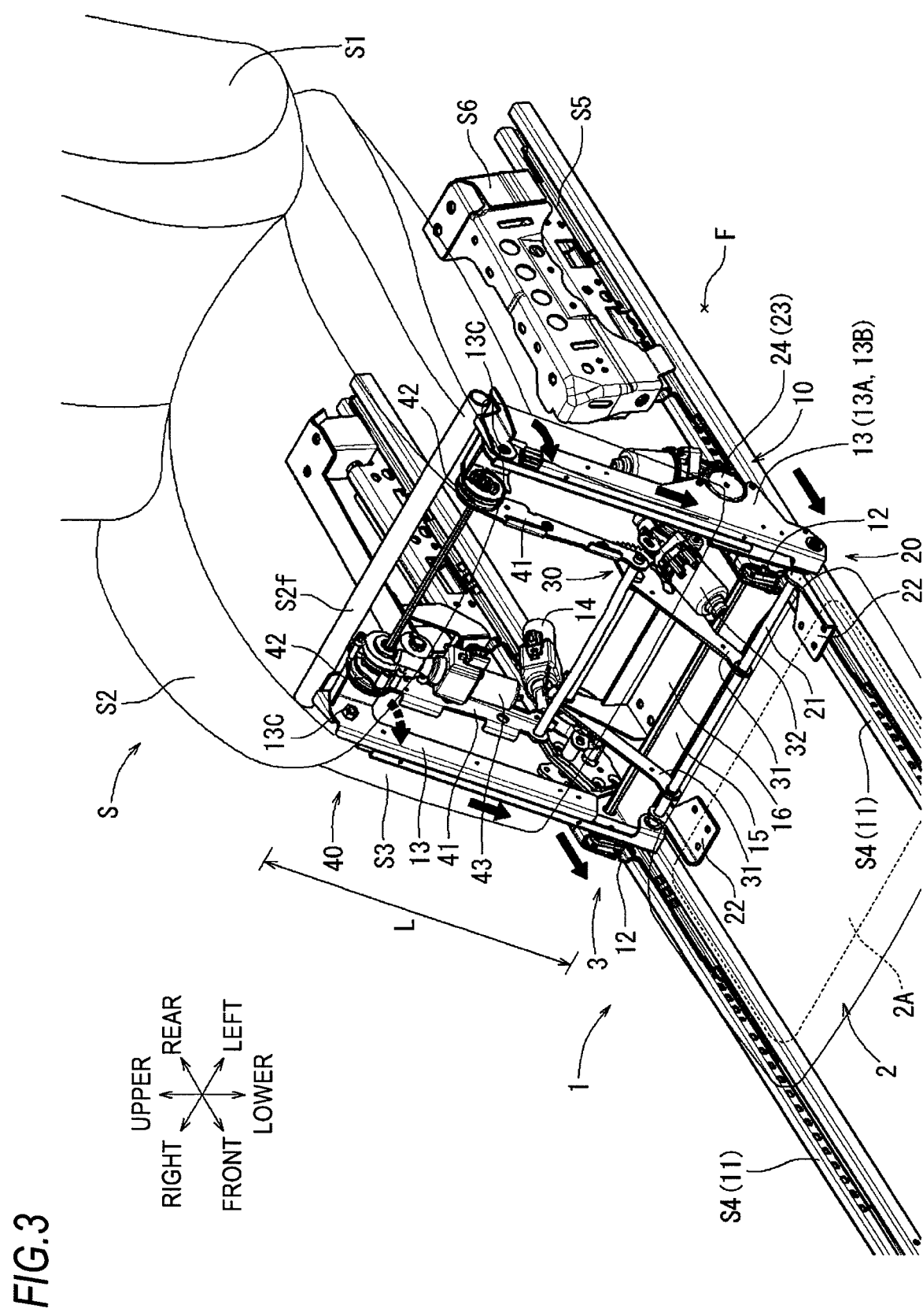
FIG. 3 is a perspective view showing a state in which a footrest is moved forward.
Figure 4:
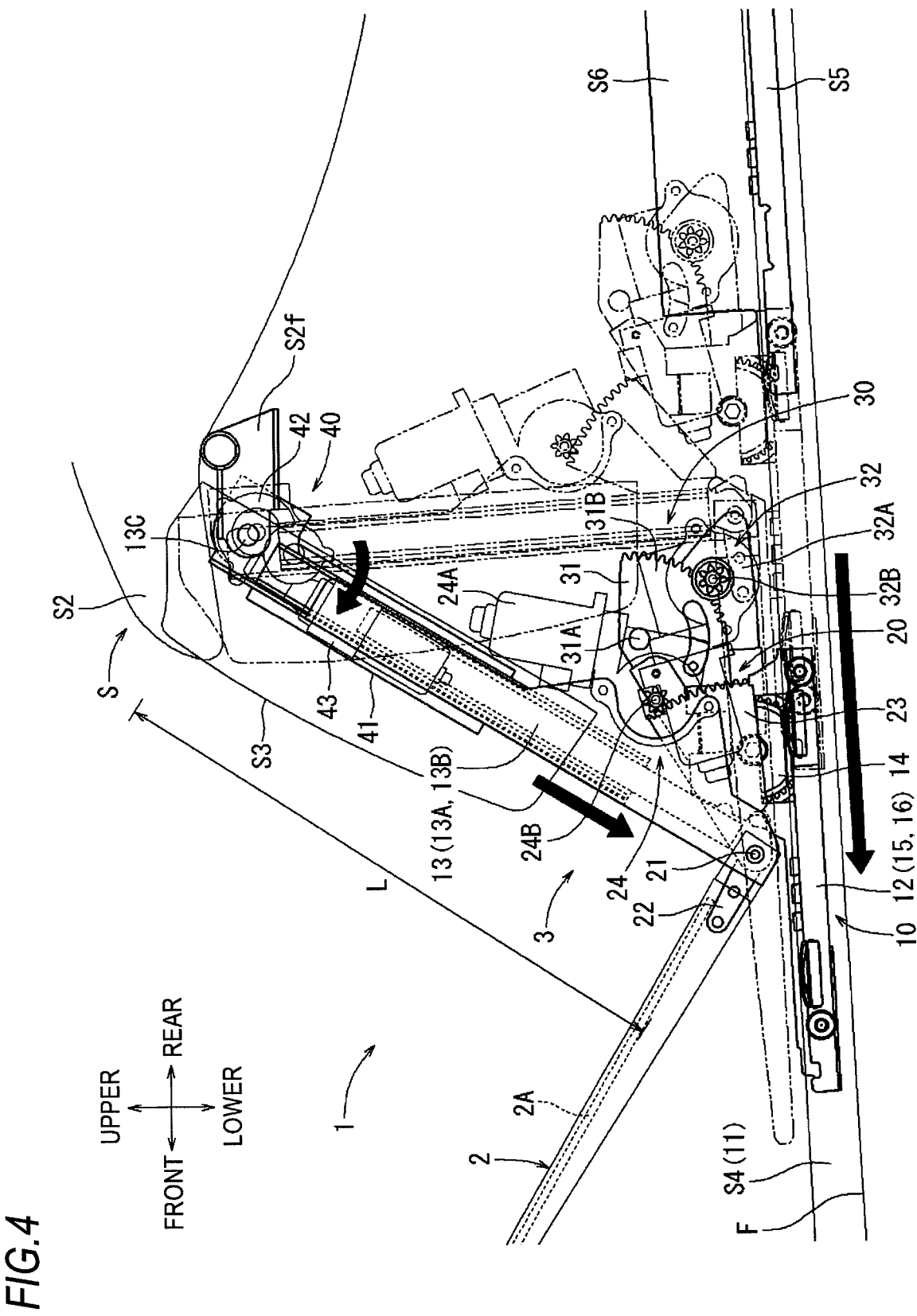
FIG. 4 is a side view of FIG. 3.

As shown in FIGS. 1 and 2, in a rearmost position state where the sliders 12 are closest to the seat S from the front side, each of the pair of left and right variable-length arms 13 is held in a state where it hangs down straight from the rotation shaft 13C on the upper end side and it has a shortest shape in which the first arm 13A and the second arm 13B are maximally overlapped with each other. Further, as shown in FIGS. 3 and 4, as the sliders 12 are slid forward from the rearmost position, the variable-length arms 13 rotate forward about the rotation shafts 13C on the upper end side thereof and a bridging length L between the connection shaft 21 on the sliders 12 and the connection bracket S2f is changed to extend in accordance with a sliding displacement between the first arm 13A and the second arm 13B.

When the variable-length arms 13 extends, the variable-length arms 13 are bridged between the connection shaft 21 on the sliders 12 and the connection bracket S2f, but can appropriately release an amount of movement of the sliders 12 moving away from the seat S toward the front side. Further, as the sliders 12 approach the seat S from the position that are away from the front side of the seat S, conversely to the above, the variable-length arms 13 rotate rearward about the rotation shafts 13C on the upper end side thereof and the bridging length L between the connection shaft 21 on the sliders 12 and the connection bracket S2f is changed to be contracted in accordance with the sliding displacement between the first arm 13A and the second arm 13B.

Figure 9:
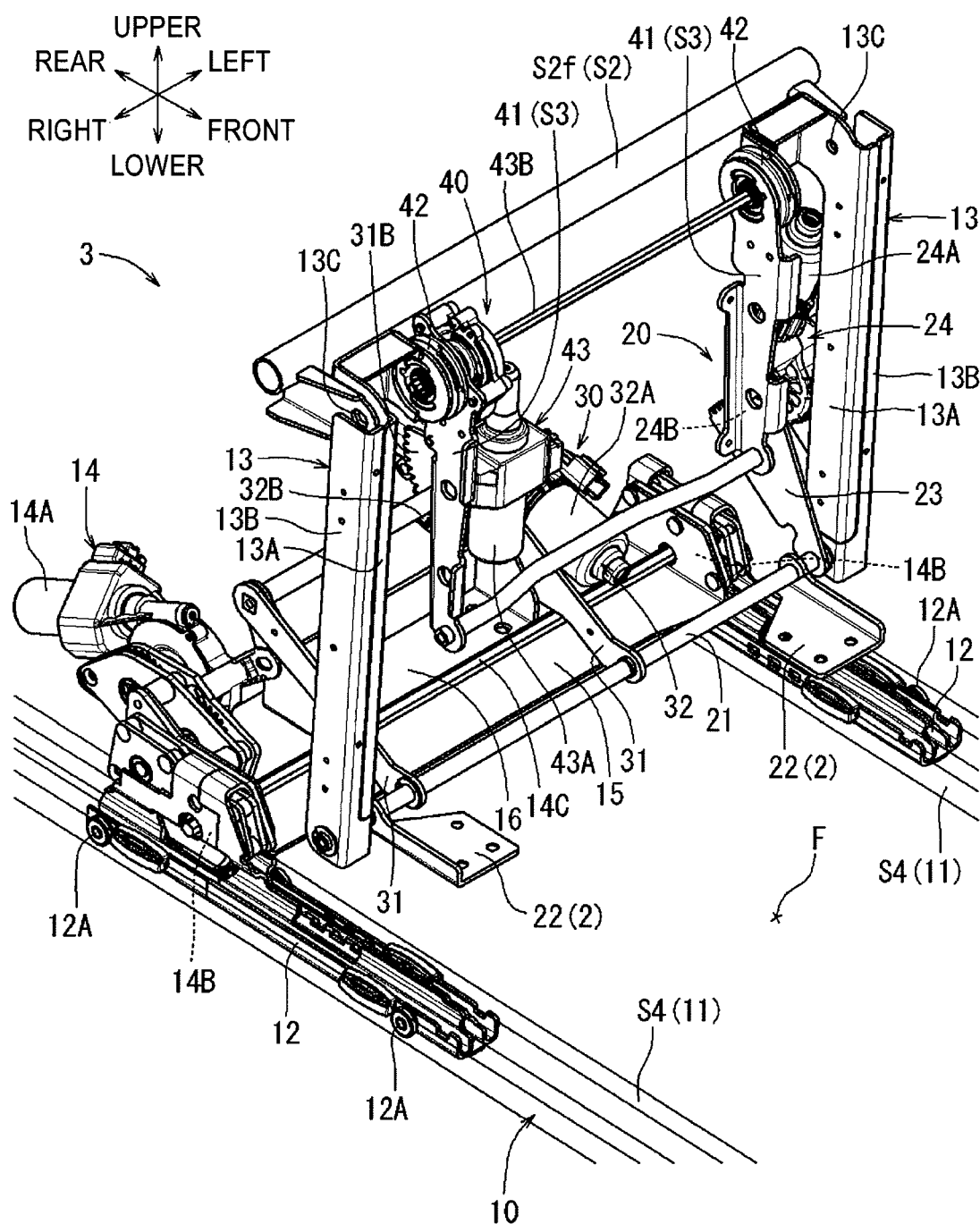
FIG. 9 is a perspective view of FIG. 8 as seen from the opposite side.

As shown in FIGS. 9 to 11, the driving unit 14 includes an electrically driven motor 14A assembled to the right slider 12, the wheels 14B incorporated in the left and right sliders 12, and a rod 14C connecting the wheels 14B to each other in a state of being integrally driven so as to transmit a rotational output from the motor 14A to the wheels 14B on each side to rotationally drive the wheels 14B. The wheels 14B are connected to the sliders 12 so as to be rotatable around an axis extending in the seat width direction. The wheels 14B are rotationally driven by receiving the rotational output from the motor 14A and roll on the rails 11, thereby allowing the sliders 12 to be slid in the seat front and rear direction.

⟨Configuration of Tilt Mechanism 20⟩

The tilt mechanism 20 includes the connection shaft 21 bridged in a state of being rotatably connected between the lower end portions of the second arms 13B of the variable-length arms 13, a pair of left and right mounting brackets 22 integrally coupled to portions of the connection shaft 21 located inwardly from the second arms 13B, a sector gear 23 integrally coupled to a portion of the connection shaft 21 located inwardly from the left second arm 13B, and a driving unit 24 attached to the left second arm 13B to transmit a rotational driving force to the sector gear 23.

Figure 5:
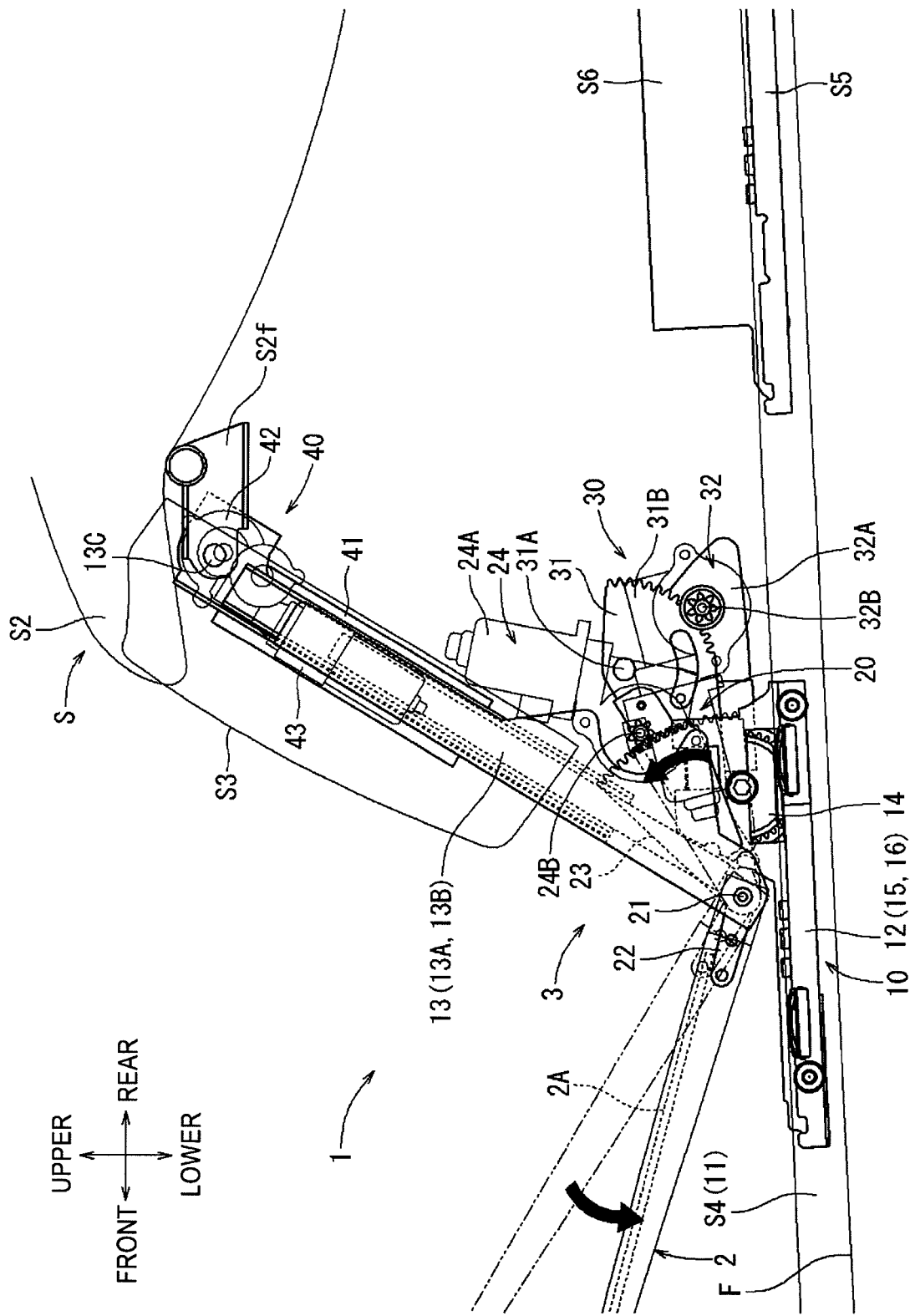
FIG. 5 is a side view showing a state in which a use angle of the footrest is widened.

The connection shaft 21 is rotatably connected between the lower end portions of the pair of left and right second arms 13B but is held in a state where its rotation is stopped when the rotation of the sector gear 23 integrally coupled to the connection shaft 21 is prevented by a braking force of the driving unit 24 (to be described later). Further, as shown in FIG. 5, when the sector gear 23 is rotated by the driving of the driving unit 24, the connection shaft 21 is adapted to be rotated in a corresponding rotational direction.

As shown in FIGS. 9 to 11, each of the pair of left and right mounting brackets 22 extends forward from the connection shaft 21 and is integrally attached to the footrest 2 to support the footrest 2 from the lower side. With the above attachment, as shown in FIG. 5, since the rotational angle of the connection shaft 21 integrally coupled to the mounting brackets 22 can be changed by the driving of the driving unit 24, the mounting brackets 22 are adapted to change the angle of the footrest 2 around the connection shaft 21 in the seat height direction.

As shown in FIGS. 9 to 11, the driving unit 24 includes an electrically driven motor 24A assembled to the left second arm 13B, and a pinion 24B directly coupled to an output shaft of the motor 24A. As shown in FIG. 5, the pinion 24B is in a state of being meshed with a tooth surface on the outer peripheral side of the sector gear 23 extending rearward and upward from the connection shaft 21. The pinion 24B is rotationally driven by receiving the rotational output from the motor 24A and rotates the sector gear 23 in a corresponding rotational direction so as to rotate the connection shaft 21.

⟨Configuration of Lift Mechanism 30⟩

As shown in FIGS. 8 to 11, the lift mechanism 30 includes a pair of left and right lifter arms 31 rotatably connected to two left and right positions of the connection shaft 21 of the tilt mechanism 20 and extending rearward, and a driving unit 32 configured to transmit a rotational driving force to a sector gear 31B formed in a rear end area of the left lifter arm 31. The pair of left and right lifter arms 31 is configured such that rear end portions thereof are rotatably connected to upper end portions of the support bracket 16 attached on the base 15 of the slide mechanism 10 by a connection shaft 31A extending in the seat width direction.

Figure 6:
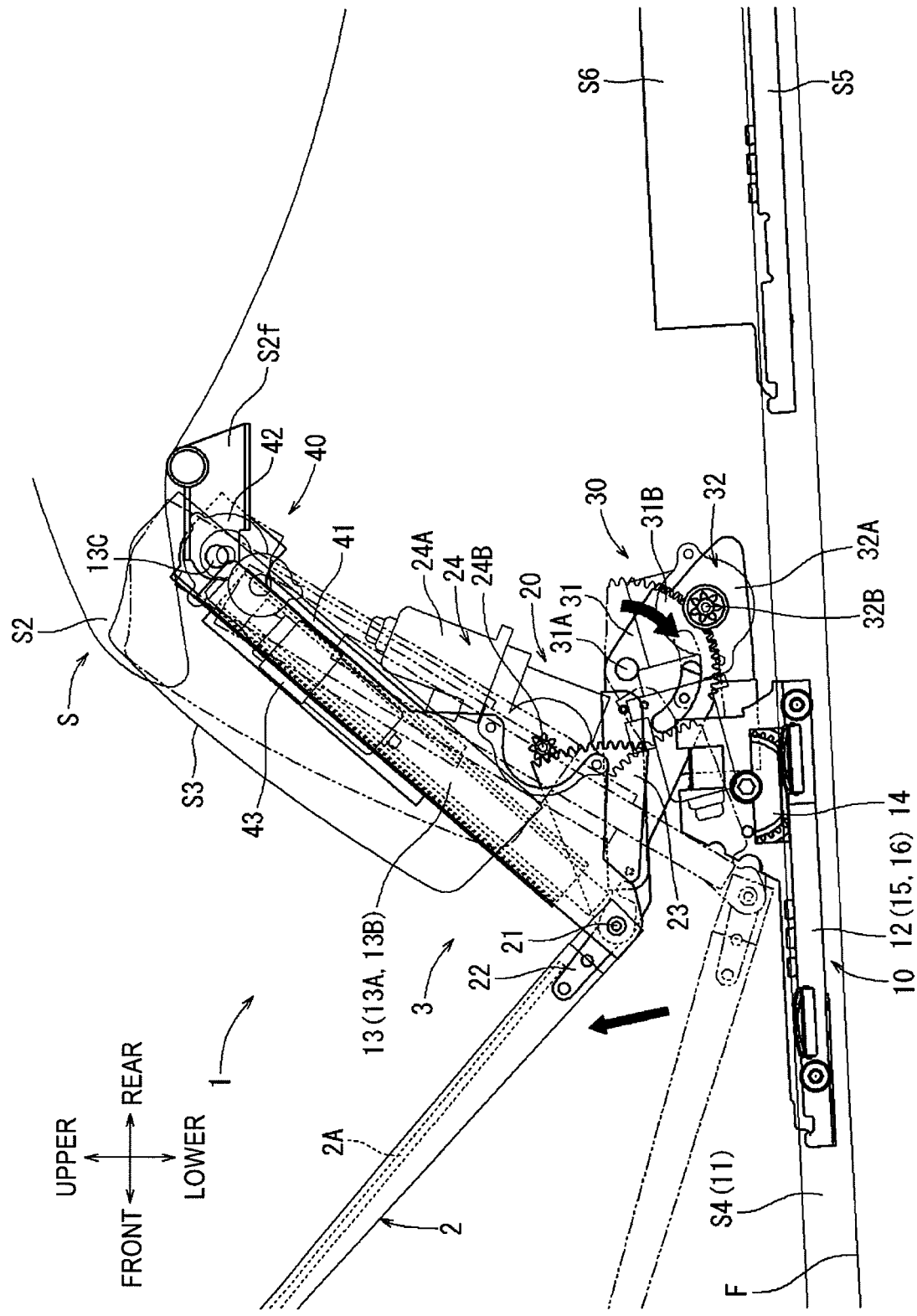
FIG. 6 is a side view showing a state in which a use height of the footrest is raised.

As shown in FIGS. 10 and 11, the driving unit 32 includes an electrically driven motor 32A assembled on the base 15 of the slide mechanism 10, and a pinion 32B directly coupled to an output shaft of the motor 32A. As shown in FIG. 6, the pinion 32B is in a state of being meshed with a tooth surface on the outer peripheral side of the sector gear 31B formed in the rear end area of the left lifter arm 31 extending rearward and upward from the connection shaft 21. The pinion 32B is rotationally driven by receiving a rotational output from the motor 32A and rotates the sector gear 31B around the connection shaft 31A in the corresponding rotational direction so as to raise or lower the connection shaft 21 of the tilt mechanism 20 with respect to the base 15.

As the connection shaft 21 of the tilt mechanism 20 is raised or lowered, the variable-length arms 13 are raised or lowered around the rotation shaft 13C on the upper end side. Thus, the footrest 2 is rotated about the rotation shaft 13C together with the variable-length arms 13 without changing its mounting angle to the variable-length arms 13. In this manner, the position of the footrest 2 in the seat height direction is raised or lowered.

The overall configuration of the footrest moving mechanism 3 has been described above. With such a configuration, as shown in FIG. 4, as the sliders 12 constituting the slide mechanism 10 are operated to be slid in a direction away from the seat S toward the front side, the footrest moving mechanism 3 is operated in such a manner that the variable-length arms 13 rotate around the rotation shaft 13C on the upper end side to extend the bridging length L.

Due to a movement accompanying the rotation and extension of the variable-length arms 13, the footrest 2 is rotated about the rotation shaft 13C together with the variable-length arms 13 without changing its mounting angle to the variable-length arms 13. In this manner, the use angle of the footrest is shifted to the front side and the use angle thereof is changed upward. Therefore, the footrest 2 can be used in a state of a comfortable posture in which a seated person sitting on the seat S stretches his legs forward and puts his heels to face forward.

⟨Configuration of Ottoman Moving Mechanism 40⟩

An ottoman moving mechanism 40 is bridged between the pair of left and right variable-length arms 13 which are bridged between a front end portion of the seat cushion S2 and the sliders 12 on the floor F. The ottoman moving mechanism 40 is operated to raise the ottoman S3, which serves as the foot placement part of the seat S described with reference to FIGS. 1 and 2, from the front edge of the cushion S2. With such a configuration, as shown in FIG. 4, as the sliders 12 are operated to be slid in a direction away from the seat S toward the front side, the ottoman S3 is rotated about the rotation shaft 13C together with the variable-length arms 13 and is deployed to be raised from the front edge of the seat cushion S2.

Figure 7:
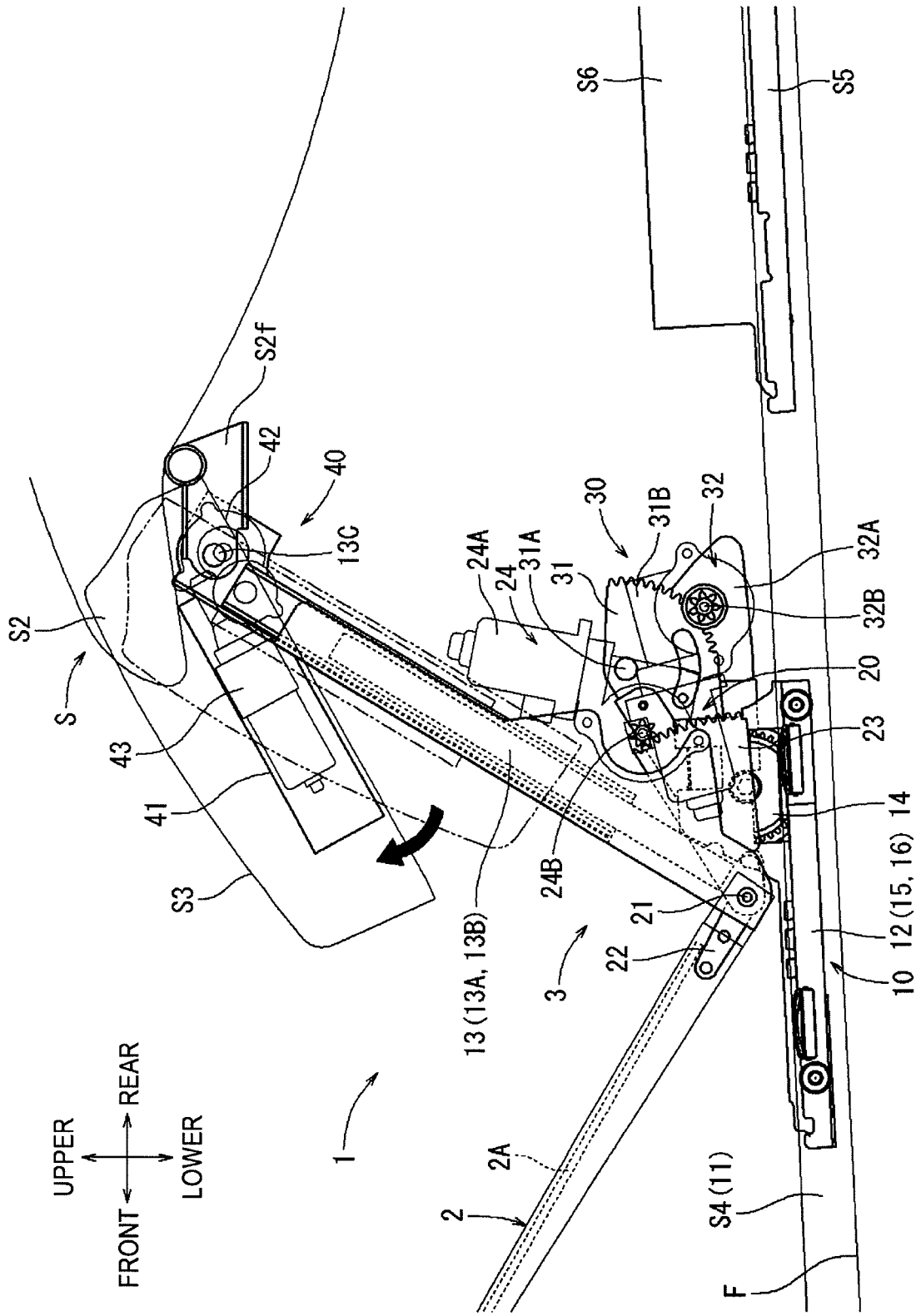
FIG. 7 is a side view showing a state in which an ottoman is deployed.
Figure 8:
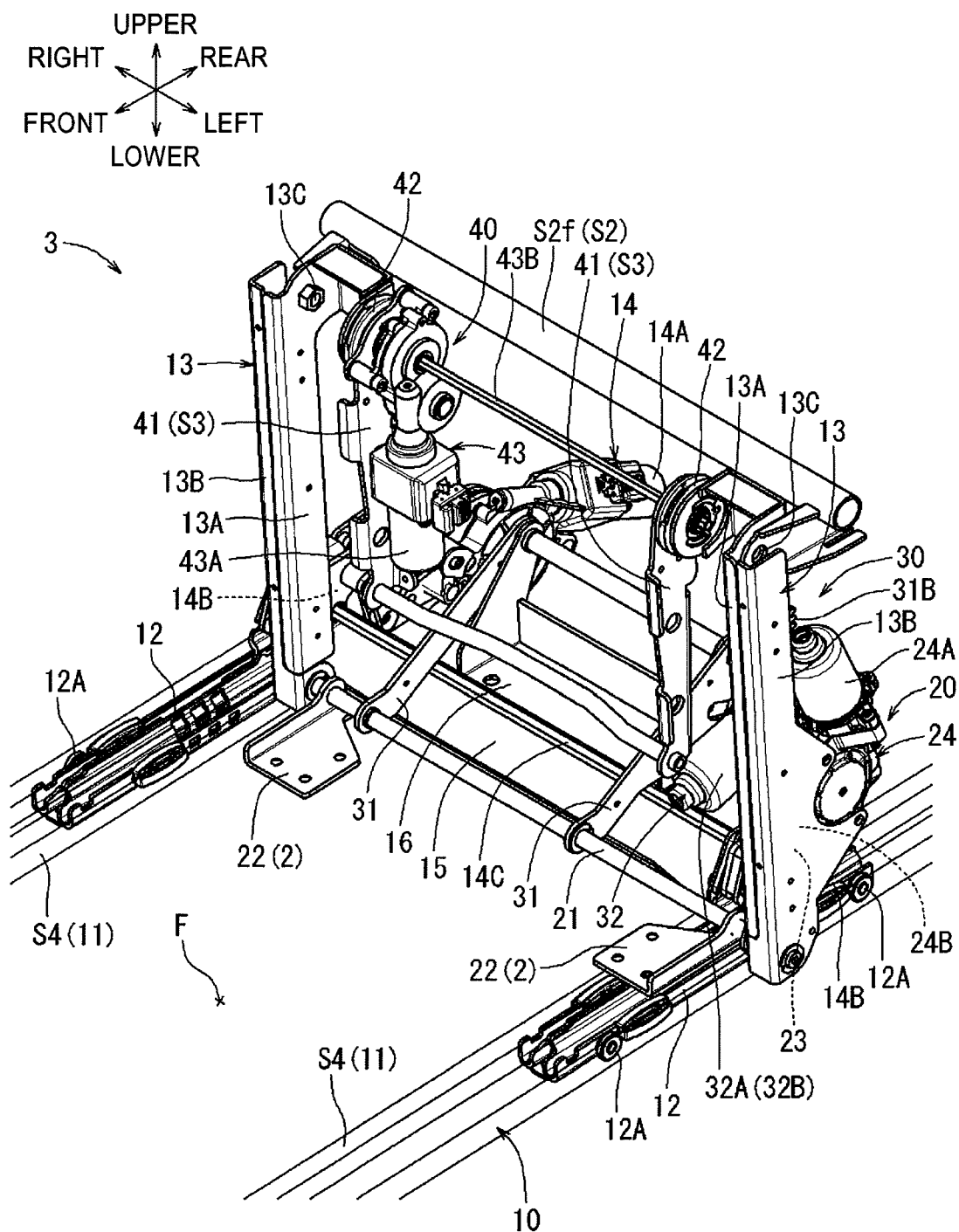
FIG. 8 is a perspective view showing the entire configuration of a footrest moving mechanism.

Further, when the ottoman moving mechanism 40 is further operated from the state in which the ottoman S3 is deployed to the front side by sliding the sliders 12, the ottoman S3 can be deployed to be further raised forward and upward from the variable-length arms 13, as shown in FIG. 7. Specifically, as shown in FIGS. 8 to 11, the ottoman moving mechanism 40 includes a pair of left and right side arms 41 forming a framework of the left and right sides of the ottoman S3, rotary shaft devices 42 configured to connect upper end portions of the side arms 41 to upper end positions of the first arms 13A of the variable-length arms 13 in a state of being rotatable around the axis in the seat width direction, and a driving unit 43 configured to transmit a driving force for rotating the side arms 41 to the rotary shaft devices 42. Here, the rotation of the rotary shaft devices 42 can be stopped.

Each of the rotary shaft devices 42 for connecting the side arms 41 to the first arms 13A is configured by an adjuster mechanism such as a stepless electric recliner disclosed in the literatures such as JP-A-2016-49797. When the rotation of the rotary shaft devices 42 is stopped by a braking force of the driving unit 43, the rotary shaft devices 42 hold the side arms 41 in a state where the rotation of the side arms 41 is stopped. When the rotary shaft devices 42 are rotated by driving the driving unit 43, the rotary shaft devices 42 are adapted to rotationally operate the side arms 41 in a corresponding rotational direction.

The driving unit 43 includes an electrically driven motor 43A assembled to the right side arm 41, and a rod 43B inserted and connected to internal driving mechanisms (not shown) of the rotary shaft devices 42 in a state of being connected to an output shaft of the motor 43A so as to be able to transmit power. When the motor 43A is rotationally driven, the driving unit 43 transmits the rotational driving force of the motor 43A to the internal driving mechanisms (not shown) of the rotary shaft devices 42 on each side via the rod 43B, thereby causing relative rotation between the rotary shaft devices 42 themselves. In this manner, the side arms 41 are rotated relative to the first arms 13A in a corresponding rotational direction.

⟨Summary⟩

To summarize the above, the footrest device (1) of the present embodiment is the vehicle footrest device (1) including the footrest (2) installed on the vehicle floor (F); and the footrest moving mechanism (3) movably connecting the footrest (2) to the vehicle floor (F), the footrest moving mechanism (3) including: the rail (11) fixed on the vehicle floor (F) and extending in the front and rear direction; the slider (12) configured to be guided so as to be slidable in the front and rear direction along the rail (11); and the variable-length arm (13) bridged in the height direction between the sliders (12) and the vehicle seat (S) on which a user of the footrest (2) sits and configured to change the bridging length (L) between the slider (12) and the vehicle seat (S) by the sliding displacement of the variable-length arms (13) in response to the forward and rearward movement of the slider (12), wherein the footrest (2) is connected to the variable-length arms (13), and the position in the front and rear direction and the inclination angle of the footrest (2) to the vehicle floor (F) are configured to be changed according to the movement of the variable-length arm (13) caused by the forward and rearward movement of the slider (12).

With such a configuration, when the slider (12) is moved forward, the use position of the footrest (2) is moved away from the vehicle seat (S) toward the front side and the inclination angle thereof is changed to be raised rearward in accordance with the movement of the variable-length arm (13). With the above operation, the footrest (2) can be used in a state of a comfortable posture in which a seated person stretches his legs forward and puts his heels to face forward. Further, when the slider (12) is moved rearward, the use position of the footrest (2) is brought close to the vehicle seat (S) and the inclination angle thereof is changed to be laid downward in accordance with the movement of the variable-length arm (13). With the above operation, the footrest (2) can be used in a state of a comfortable posture in which a seated person lowers his legs and puts his heels to face downward. In this manner, the use position of the footrest (2) can be appropriately changed.

Further, the footrest moving mechanism (3) further includes the tilt mechanism (20) capable of adjusting the mounting angle of the footrest (2) with respect to the variable-length arm (13) in a fixable manner.

With such a configuration, the use angle of the footrest (2) can be appropriately adjusted by the tilt mechanism (20), irrespective of the use position in the front and rear direction of the footrest (2).

Further, the footrest moving mechanism (3) further includes the lifter mechanism (30) capable of adjusting the mounting height of the variable-length arm (13) with respect to the slider (12) in a fixable manner.

With such a configuration, the use height of the footrest (2) can be appropriately adjusted by the lifter mechanism (30), irrespective of the use position in the front and rear direction of the footrest (2). Specifically, since the use height of the footrest (2) is adjusted by the lifter mechanism (30), the use angle of the footrest (2) can be adjusted to a user-friendly form in such a manner that the footrest (2) is raised rearward with the raising of the use height and the footrest (2) is laid downward with the lowering of the use height by the rotation around the connection point (13C) of the variable-length arm (13) with the vehicle seat (S).

Furthermore, the footrest device (1) further includes the ottoman (S3) attached to the variable-length arm (13).

With such a configuration, even when the footrest (2) is adjusted to any use position or any use angle, the seated person can use the footrest (2) and the ottoman (S3) in such a manner that his lower legs are placed on the ottoman (S3) and his heels are placed on the footrest (2). Further, since the ottoman (S3) can be deployed from the moved position of the variable-length arm (13), the ottoman (S3) can be efficiently moved from the moved position of the footrest (2).

Further, the footrest moving mechanism (3) is configured to change the bridging length (L) between the slider (12) and the vehicle seat (S) while the variable-length arm (13) is rotated with respect to the vehicle seat (S) by electrically driving the slider (12) in the front and rear direction.

With such a configuration, the footrest moving mechanism (3) can be smoothly operated and the load applied to the footrest (2) can be appropriately received by the sliders (12).

Further, the rail (11) is configured by the slide rail (S4) that connect the vehicle seat (S) to the vehicle floor (F) so as to be slidable in the front and rear direction.

In this manner, the rail (11) is configured by the slide rail (S4), so that the configuration can be rationalized and the installation space can be secured as appropriate.

Furthermore, the footrest device (1) further includes the heat source (2A) provided on the footrest (2) and configured to radiate heat from the upper side.

With such a configuration, it is possible to efficiently impart a thermal sensation to the heels placed on the footrest (2).

Further, the variable-length arm (13) is configured by a plurality of split arms (13A, 13B) which are divided in the direction of the bridging length (L) between the slider (12) and the vehicle seat (S) and combined with each other so as to be slidable in the extendable manner.

With such a configuration, as compared with a configuration in which the variable-length arms (13) are slidably displaced with respect to the vehicle seat (S) by a slidable connection of a long hole and a pin, the shape of the variable-length arm (13) does not protrude beyond the range of the bridging length (L), and thus, the overall configuration can be made compact.

《Other Embodiments》

Although the embodiments of the disclosure have been described using one embodiment, the disclosure can be implemented in various forms other than the above embodiment. For example, the vehicle footrest device of the disclosure can be used for various vehicles other than automobiles, such as trains, aircrafts and ships. Further, the heat source for radiating heat from the upper side of the footrest may be a heating appliance such as a panel heater or may be a cooling appliance. Further, the heat source may be incorporated in the footrest or may be externally attached to the footrest. Further, the heat source as described above may be provided so as to radiate heat from the upper side of the ottoman.

Further, the footrest moving mechanism for movably connecting the footrest to the vehicle floor may be configured in such a manner that the variable-length arms are bridged between the sliders on the floor and the front-side seat disposed on the front side of the vehicle seat on which a user of the footrest is seated, and the bridging length of the variable-length arms is changed by the sliding displacement of the variable-length arms in response to the forward and rearward movement of the sliders.

Further, the variable-length arms do not necessarily have an extendable structure. For example, the variable-length arms may be bridged between the sliders and the vehicle seat such that the bridging length between the sliders and the vehicle seat is changed in response to the forward and rearward movement of the sliders as described above. That is, the variable-length arms may have a length exceeding the bridging length between the sliders and the vehicle seat in an initial state. In accordance with the forward and rearward movement of the sliders, connection point to the slider or the vehicle seat may be moved to change the bridging length between the sliders and the vehicle seat by using a slide structure such as a slidable connection structure of a long hole and a pin.

Further, each of the slide mechanism, the tilt mechanism and the lifter mechanism constituting the footrest moving mechanism may be a manual type using a lock releasing mechanism or the like, in addition to an electric type. Similarly, the ottoman moving mechanism may be a manual type or an electric type. Further, the rails for guiding the movement of the sliders sliding together with the footrest may be configured by rails separate from the slide rails provided for adjusting the slide position of the vehicle seat in the front and rear direction.

What is claimed is:

1. A vehicle footrest device comprising:
    a footrest installed on a vehicle floor; and
    a footrest moving mechanism movably connecting the footrest to the vehicle floor, the footrest moving mechanism comprising:
        a rail fixed on the vehicle floor and extending in a front and rear direction;
        a slider configured to be guided so as to be slidable in the front and rear direction along the rail by being electrically driven; and
        a variable-length arm configured to connect to a vehicle seat, said variable-length arm being bridged in a height direction between the slider and a vehicle seat on which a user of the footrest sits and configured to change a bridging length between the slider and the vehicle seat by a sliding displacement of the variable-length arm in response to a forward and rearward movement of the slider,
    wherein the footrest is connected to the variable-length arm, and a position in the front and rear direction and an inclination angle of the footrest to the vehicle floor are configured to be changed according to a movement of the variable-length arm caused by the forward and rearward movement of the slider.

2. The vehicle footrest device according to claim 1, wherein the footrest moving mechanism further includes a tilt mechanism capable of adjusting a mounting angle of the footrest with respect to the variable-length arm in a fixable manner.

3. The vehicle footrest device according to claim 1, wherein the footrest moving mechanism further includes a lifter mechanism capable of adjusting a mounting height of the variable-length arm with respect to the slider in a fixable manner.

4. The vehicle footrest device according to claim 1, further comprising:
    an ottoman attached to the variable-length arm.

5. The vehicle footrest device according to claim 1, wherein the footrest moving mechanism is configured to change the bridging length between the slider and the vehicle seat while the variable-length arm is rotated with respect to the vehicle seat by electrically driving the slider in the front and rear direction.

6. The vehicle footrest device according to claim 1, wherein the rail is configured by a slide rail that connects the vehicle seat to the vehicle floor so as to be slidable in the front and rear direction.

7. The vehicle footrest device according to claim 1, further comprising:
    a heat source provided on the footrest and configured to radiate heat from an upper surface side of the footrest.

8. The vehicle footrest device according to claim 1, wherein the variable-length arm is configured by a plurality of split arms which are divided in the direction of the bridging length between the slider and the vehicle seat and combined with each other so as to be slidable in an expandable manner.

* * * * *